US007149063B2

(12) United States Patent
Bryan et al.

(10) Patent No.: US 7,149,063 B2
(45) Date of Patent: Dec. 12, 2006

(54) APPARATUS, METHODS AND ARTICLES OF MANUFACTURE TO MINIMIZE ARCING IN ELECTRICAL CONNECTORS

(75) Inventors: Lyle S. Bryan, Winston-Salem, NC (US); Jeremy C. Patterson, McIeansville, NC (US); Edwin G. Cox, Jamestown, NC (US)

(73) Assignee: Tyco Electronics Corporation, Middletown, PA (US)

( * ) Notice: Subject to any disclaimer, the term of this patent is extended or adjusted under 35 U.S.C. 154(b) by 289 days.

(21) Appl. No.: 10/760,764

(22) Filed: Jan. 20, 2004

(65) Prior Publication Data

US 2005/0157443 A1 Jul. 21, 2005

(51) Int. Cl.
*H01H 9/30* (2006.01)
(52) U.S. Cl. ............................................. 361/13; 361/8
(58) Field of Classification Search .................... 361/2, 361/8, 13
See application file for complete search history.

(56) References Cited

U.S. PATENT DOCUMENTS

| 3,588,605 | A | | 6/1971 | Casson |
| 4,438,472 | A | | 3/1984 | Woodworth |
| 4,658,320 | A | * | 4/1987 | Hongel ......................... 361/13 |
| 6,188,554 | B1 | | 2/2001 | Chung ........................... 361/58 |
| 6,659,783 | B1 | * | 12/2003 | Copper et al. ............... 439/181 |
| 2002/0015270 | A1 | | 2/2002 | Bonnet ......................... 361/10 |
| 2004/0179313 | A1 | * | 9/2004 | Cleveland ....................... 361/2 |

* cited by examiner

*Primary Examiner*—Stephen W. Jackson
*Assistant Examiner*—Terrence Willoughby

(57) ABSTRACT

An electrical connector and methods for minimizing arcing when the connector is connected or disconnected under load are disclosed. The invention provides an arc reduction circuit with one or more regulators, such as transistors, integrated into the connector housing that sense movement of the connector and shunt the current to an impedance circuit when a potential arc condition is sensed.

20 Claims, 5 Drawing Sheets ial connector assemblies, and more particularly, the invention relates to an
APPARATUS, METHODS AND ARTICLES OF MANUFACTURE TO MINIMIZE ARCING IN ELECTRICAL CONNECTORS

FIELD OF THE INVENTION

The invention relates generally to electrical connector assemblies, and more particularly, the invention relates to an electrical connector that includes components to prevent or at least minimize the occurrence of arcing.

BACKGROUND OF THE INVENTION

Electrical connectors provide an electrical pathway or junction to provide a mechanical connection between wires, circuit leads, components or other current carrying devices. Typically, electrical connectors are connected or disconnected during periods when there is no current passing through the device. Although not generally recommended, electrical connectors may be connected or disconnected under load, depending on the voltage and current levels. This can, in turn, lead to an arcing condition where current jumps across an air gap between contacts. Depending upon the design and construction of the system, arcing can cause serious damage to the component, such as pitting, or may lead to the connector being welded or fused in place when the connector pins are melted by the arc. In addition, in many systems, the voltage and current levels are high enough to also cause bodily harm to an operator attempting to connect or disconnect the line under load.

U.S. Pat. No. 3,588,605 to Casson discloses an electromechanical switch with arc suppression that has a gate circuit for use in alternating current devices comprised of reactive passive elements that sense the level of voltage across the switch contacts. The disclosed switch is designed to limit current when the switch breaks the circuit to minimize damage to the contacts and prolong the life of the equipment.

U.S. Pat. No. 4,438,472 to Woodworth discloses a direct current device for suppressing arcs in mechanical switches or circuit breakers. The disclosed design uses a bipolar transistor to actively shunt current around the switch when the contacts are opened during opening or during any "bounce" upon closing.

In view of the foregoing, it would be desirable to provide a connector that minimizes or eliminates arcing. It would also be desirable to provide a connector that reduces or minimizes arcing without requiring a separate arc control system, so that the improvement may be integrated into existing systems without extensive re-design.

SUMMARY OF THE INVENTION

In accordance with the invention, an embodiment is disclosed as an arc suppressing connector having a housing and at least one current conducting element and arc suppression circuit connected in parallel with the contacts of a connector, relay, or other connection device, between a current source and a load. The arc suppression circuitry may detect an arc by monitoring voltage across the contacts, and when the voltage reaches a predetermined level, diverting power through a FET to a load, whereby arcing is suppressed when the connector is engaged or disengaged. The arc suppression circuitry may be disposed within the connector housing. Typically, the current conducting elements will either be a connector pin, a socket, or relay contacts. In certain embodiments, the connector is part of a direct current system, and in one embodiment described in detail herein, the system is 42 VDC. In some embodiments, the connector housing will have sense pins that slide along the current conducting element as the connector is engaged and disengaged from a connected condition.

One embodiment provides an electrical connector that has a set of contacts and an arc suppression circuit that has a FET having its drain and source coupled to the contacts. The circuit also may have one or more capacitors for charging when the FET is turned on, shunting current around the connector. The circuit also may have one or more resistors for discharging the capacitor such that the FET turns off after it turns on, thereby terminating load current shunting. One of the resistors may comprise a biasing resistor tied to the gate and the source of the FET and one of the capacitors comprises a biasing capacitor coupled at one end to the drain and at the other end to the gate, such that when the switch contacts are opened, the current passes through the biasing capacitor to the gate-to-source capacitance to charge the gate-to-source capacitance thereby turning on the FET. In certain embodiments, the diode (e.g., a Zener diode) has a cathode coupled to the gate of the FET and an anode coupled to the source of the FET, so that a biasing capacitor discharges when the switch contacts are closed.

In another exemplary embodiment, the invention also provides methods of suppressing an arc in a connector, so that when moving a current conducting element relative to its connection position while under load, the movement is sensed using arc suppression circuitry connected in parallel with the connector between a current source and a load. Power is then diverted to a FET when the voltage reaches a predetermined level and dissipates power across a load. Arcing is suppressed when the connector is engaged or disengaged. The method may include sliding sense pins along the current conducting elements as the connector is engaged and disengaged from a connected condition.

DETAILED DESCRIPTION

Figure 1:
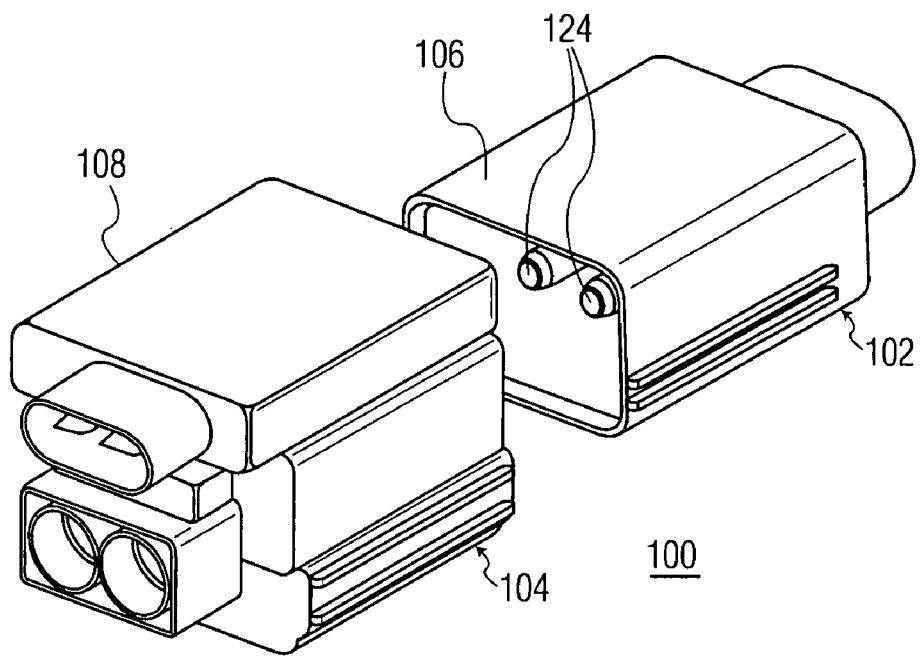
FIG. 1 is a perspective view of a connector in accordance with an embodiment of the invention.

Referring now to the drawings in detail, wherein like reference numerals indicate like elements throughout the several views, there is shown in FIG. 1 an electrical connector 100 in accordance with an embodiment of the invention that may comprise two mating halves 102,104. As illustrated, one half 102 may comprise a housing 106 and a pair of connector pins 124. The illustrated embodiment is an example of a connector intended for use in automotive or similar applications where connectors carrying sufficiently high current may be found. However, as should be understood, the invention is not limited to connectors, but may be used with any device capable of being engaged/disengaged in a similar manner, such as a relay and the like. The connector illustrated in FIG. 1 may further include a second mating half 104 that is active and further comprises a housing 108 containing arc suppression circuitry in accordance an embodiment of the invention therein, which is discussed in detail below. For purposes of illustration, the present embodiment is a 42V connector for a direct current system, but the invention is not limited thereto. For example, the invention may be used with system employing a standard 12 v battery, such as in an automobile.

Figure 2:
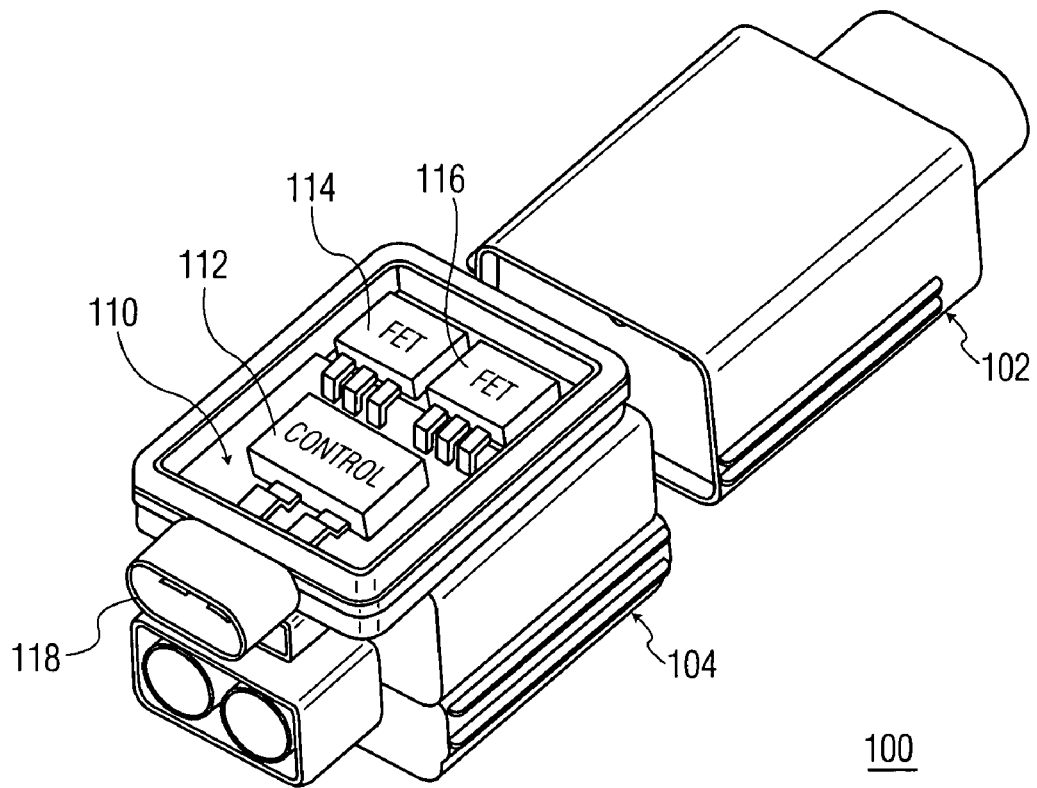
FIG. 2 is another perspective view of the connector shown in FIG. 1, with a cover removed to reveal the arc suppression circuit.

Referring now to FIG. 2, further details of the connector 100 shown in FIG. 1 are disclosed. As seen in FIG. 2, the second mating half 104 of the connector 100 may include a circuit board 110, which may include a control circuit 112 and at least one, and possibly two regulating components 114, 116 connected to the control circuit 112, for regulating one or more loads. In this embodiment, the components 114, 116 are each transistors and more specifically FET devices. In one embodiment, the control circuit 112 may be connected to a source of power (e.g., 42 v DC, as noted above) and ground via disengagable connection 118, although the invention is not limited thereto.

Figure 3:
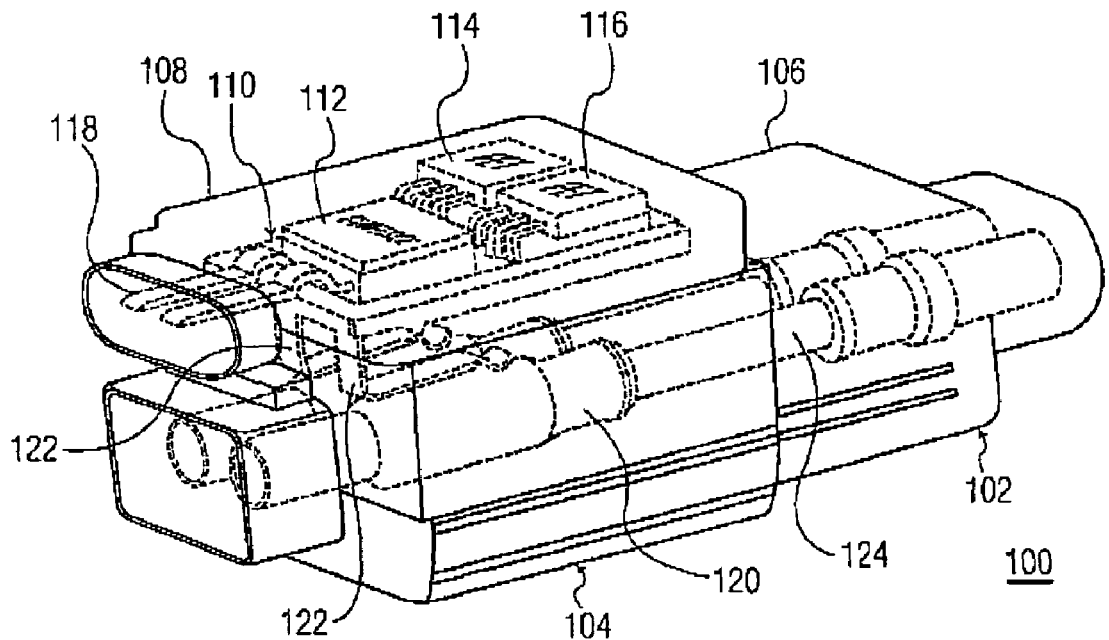
FIG. 3 is a perspective view of the connector shown in FIG. 1, with the connector body shown in phantom and illustrating the connector pins and the arc suppression circuitry.

The operation and construction of a connector made in accordance with this embodiment may be better understood with reference to FIG. 3, in which the housings 106,108 of the connector illustrated in FIGS. 1–2 are shown in phantom, to further illustrate the electrical and electronic components discussed above. In FIG. 3, it can be seen that the contact pins 124 illustrated in FIG. 1 may be connected to corresponding contacts 120 that are in turn connected to the control circuit 112. As illustrated, in the embodiment shown, a pair of sense pins 122 may divert power to the FETs 114, 116. Arcing is at least minimized, and preferably prevented, both when the connector 100 is brought into connection with the current source under load, and when the connector 100 is disconnected under load. As will be understood by those of ordinary skill in the art, the ability to connect and disconnect a connector while under load without an arc is advantageous, since arcing may damage the components of the connector and also presents a safety hazard.

Figure 4:
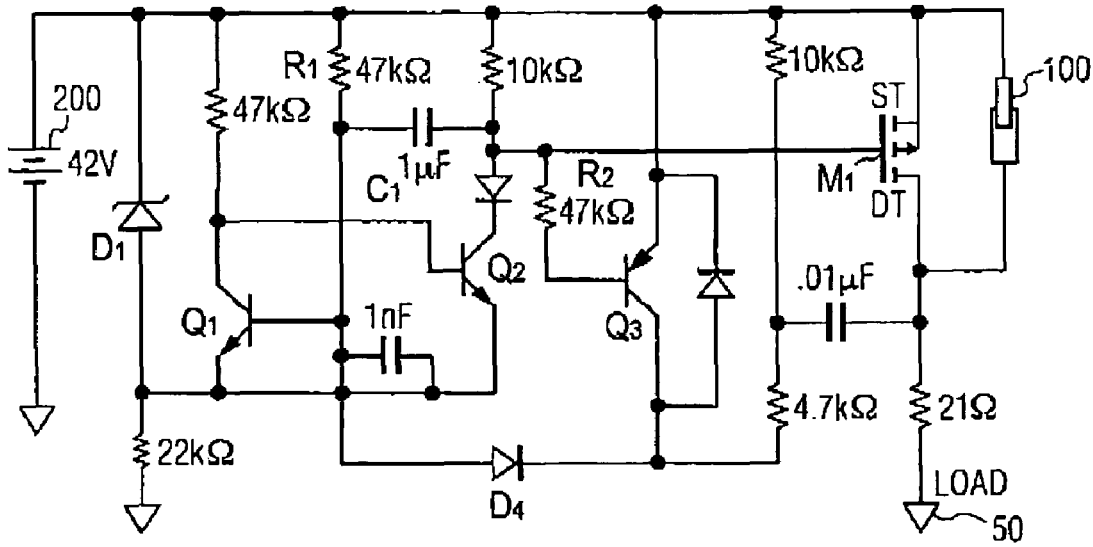
FIG. 4 is a schematic diagram of an electrical circuit in accordance with an embodiment of the invention.
Figure 5:
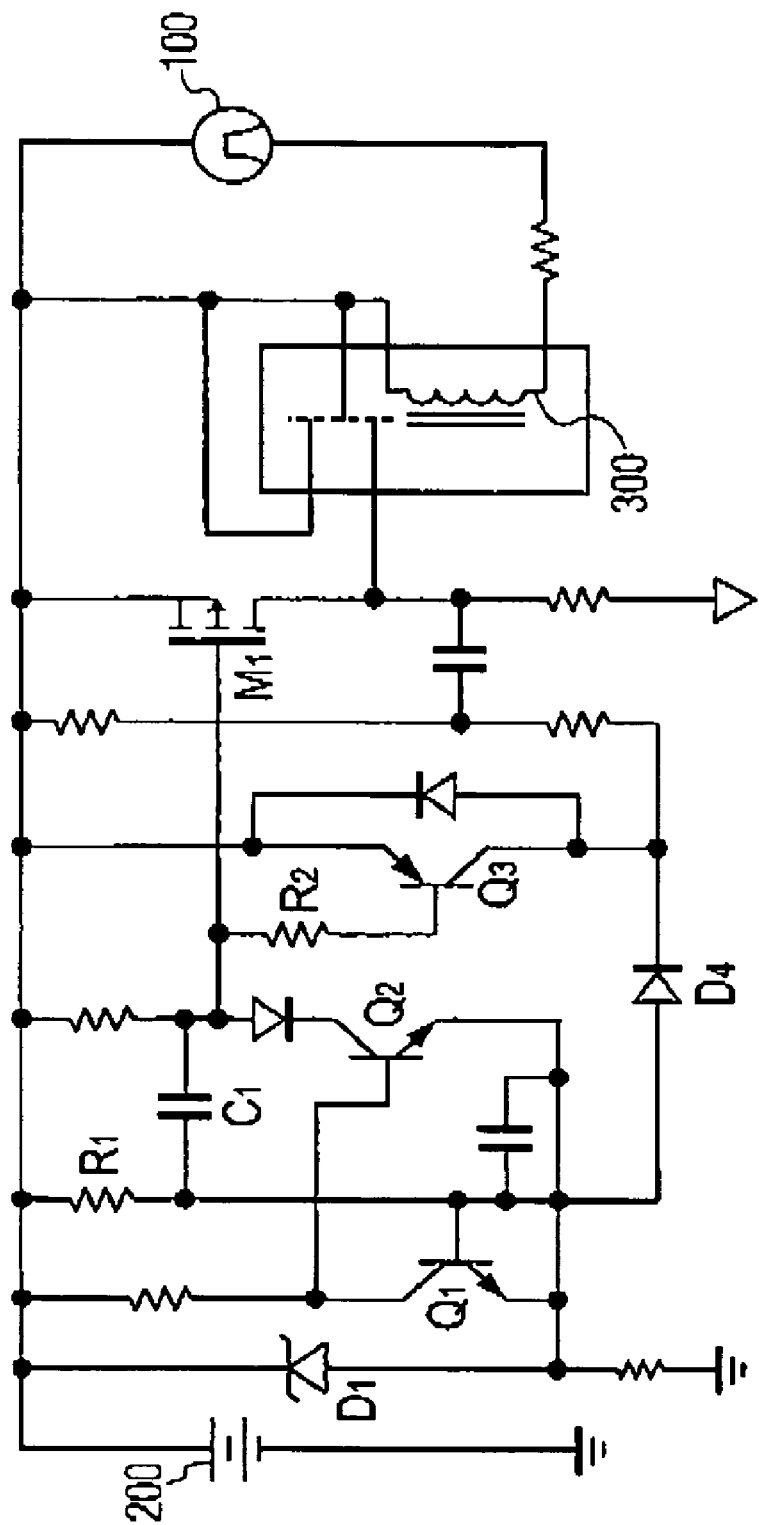
FIG. 5 is a schematic diagram of an electrical circuit in accordance with another embodiment of the invention.

An exemplary circuit that may be used in certain embodiments of the invention is illustrated in FIGS. 4 and 5. FIG. 4 illustrates a use of the circuit with a connector, while FIG. 5 illustrates the use of the circuit with a relay. As noted above, in the exemplary embodiment illustrated and discussed in detail herein, the electrical source 200 comprises a 42V direct current source. As should be understood, the values of capacitance and impedance illustrated in this embodiment are merely examples for such a circuit, and the invention is not limited to these values.

A connector 100 may be provided between the source 200 and load 50, which corresponds to the connector 100 described above with reference to FIGS. 1–3. When the connector 100 is closed, current will flow in the normal manner, and when the connector 100 is open, current is interrupted. However, as discussed above, when the connector 100 is disconnected under load without the arc suppression circuitry of the invention, arcing may generally occur.

In these embodiments, a p-channel MOSFET M1 may be placed in parallel across the contacts of connector 100. MOSFET M1 may be connected to the positive terminal of source 200 so a relatively negative gate drive may be used to enhance the p-channel of MOSFET M1, causing low RDSon and conduction.

While the contacts are opening, MOSFET M1 is turned on and provides a path through which load current may flow. Thus, the voltage across the contacts is prohibited from rising to a value sufficient to initiate an arc until the contacts have separated by such a distance that an arc will not be ignited by the largest voltage drop that is to be presented to the contacts.

This negative drive may be provided by using a monostable multivibrator incorporating npn bipolar transistors Q1 and Q2, as shown. Zener diode D1 provides a supply voltage from which the multivibrator circuit may operate. In its rest state, transistor Q1 is held on with bias current supplied by resistor R1. The multivibrator circuit may be triggered by detecting a negative going voltage transition at the drain D of MOSFET M1. Once this drain voltage has dropped by an amount sufficient to forward bias diode D4, the hold current for transistor Q1 is momentarily diverted from its base, causing transistor Q1 to turn off. The multivibrator thus proceeds to swap states, turning on transistor Q2 and forcing the base of transistor Q1 into a reverse biased state. Turning on transistor Q2 in this manner causes the voltage across source S and drain D of MOSFET M1 to increase to and beyond its threshold value and the channel resistance reduces to its very low RDSon value. As this happens, the voltage at drain D rises until it settles at a voltage close to the voltage of source 200 (e.g., 42 v) that is established by the RDSon resistance and the load current of relay 300. The voltage at drain D is held at this level until the multivibrator circuit times out, which turns MOSFET M1 off, and allows the load voltage to drop to zero.

When transistor Q2 turns on, a pnp transistor Q3 is also turned on. This acts to clamp the trigger voltage back to the voltage of source 200. This voltage clamp helps prevent the negative excursion of the voltage of drain D of MOSFET M1 from causing the multivibrator to be inadvertently re-triggered at the end of the timeout period.

The multivibrator circuit will remain in its ON state until the base voltage of transistor Q1 recovers sufficiently to become forward biased. The time interval for this to occur is controlled in most part by the RC time constant established by resistor R1 and capacitor C1. When the base of transistor Q1 is again forward biased, transistor Q1 is switched on and transistor Q2 is switched off.

The rise rate of the voltage of gate G of MOSFET M1 is primarily controlled by the RC time constant of resistor R2 and capacitor C1. As this voltage rises toward the voltage of source 200, the threshold between gate G and source S for the MOSFET M1 is reached and MOSFET M1 is turned off. During this turn off transition, pnp transistor Q3 remains on, preventing the negative voltage transition of drain D from re-triggering the multivibrator and falsely starting another delay interval.

Figure 6:
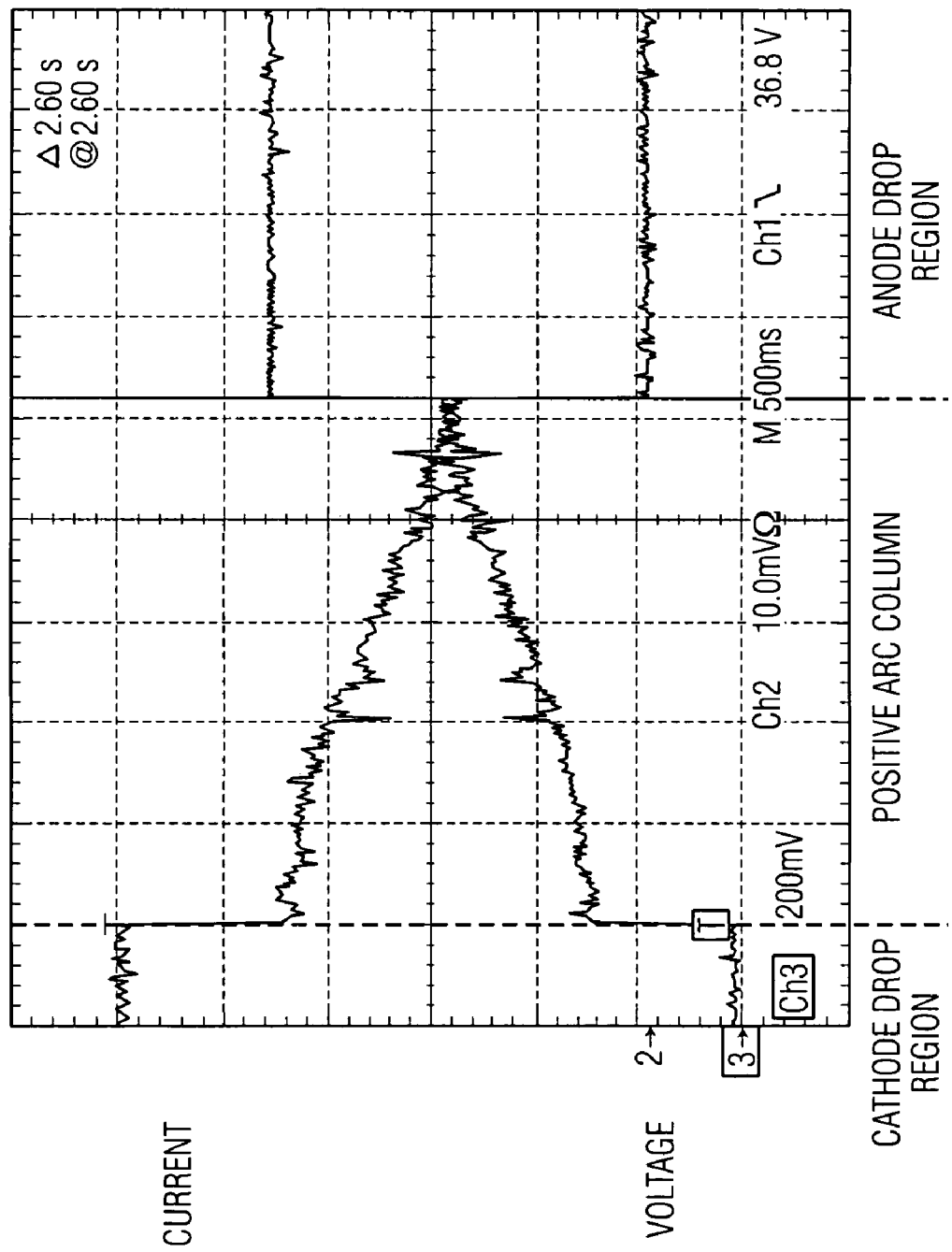
FIG. 6 is a graph of voltage and current over time as a connector is moved from a connected to a disconnected state.

FIG. 6 exemplifies an arcing event as two contacts separate under load with no arc protection. The purpose of showing this graph is to illustrate the voltage level required to cause an arc to begin. This is called the minimum arc voltage and it is slightly different for each contact material. Typically the values for minimum arc voltage for common contact materials are between 12 and 15V. This means that with sufficient current levels a stable or free burning arc can exist within these voltage levels. Preferably, a stable or free burning arc is prevented, since the arc will continue to burn in a DC environment until the contacts are either destroyed or the contact gap is increased to a level where the power supply can no longer sustain the increasing arc voltage. Since, in this example, the FET is activated when the voltage drop across the contacts reaches about 7V, then no arcing should occur. The circuit thus monitors the voltage rise across the contacts and suppresses the arc before it can develop.

Figure 7:
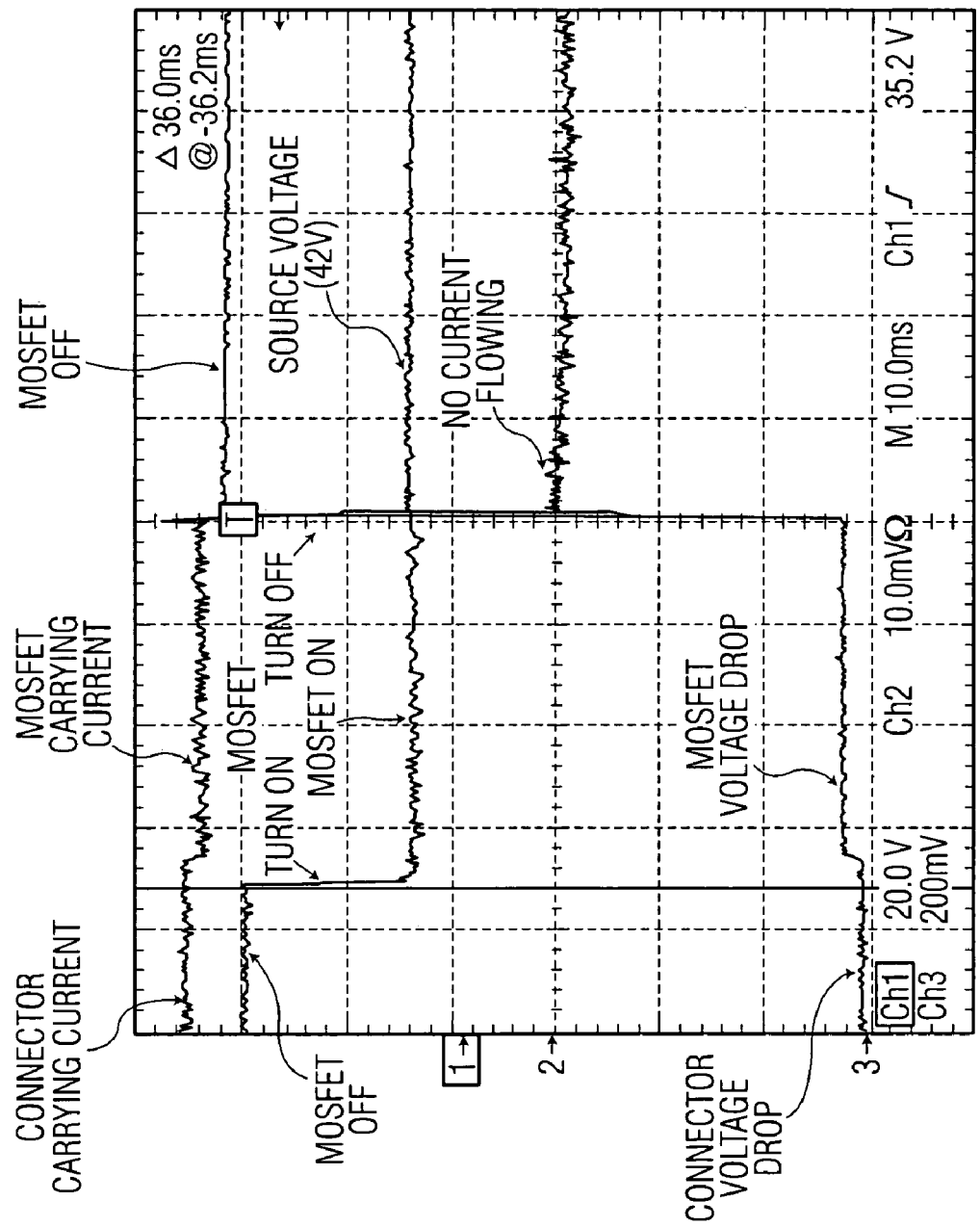
FIG. 7 is a graph illustrating the minimization of a voltage rise in accordance with aspects of the invention.

The performance of certain embodiments of the invention is illustrated in FIG. 7, which is a graph illustrating the aspect of minimizing and preventing a voltage rise sufficient to create an arc. The upper half of the graph illustrates the current across the contacts as the connector is disconnected, and the lower half illustrates the voltage across the contacts. In an interconnection such as described above with reference to an exemplary embodiment, in which a 42V system is implemented, detecting a voltage across the contacts of about 7V will prevent an arc. It can be seen in FIG. 7 that when this condition occurs, both the voltage and the current drop to zero as the control circuit takes over and diverts the current to the FETs, which acts to control a load, which dissipates the current.

Active arc suppression circuits in accordance with embodiments of the invention permits connectors to be disconnected under load by eliminating arcing through the gradual reduction of the current when the connector is disconnected. This avoids interruption of the full load, which would produce a significant arc across the contacts. Those of ordinary skill in the art will appreciate that various combinations of resistors, transistors, capacitors and diodes may be used to create circuitry that both detects and shunts the current from the connector contacts as they are being opened (or closed as the case may be). In general, a combination of semiconductor elements may be provided in certain embodiments that transfers the interrupted current away from the connector. These variations will depend upon numerous design requirements and design constraints.

Upon review of the foregoing, numerous adaptations, modifications, and alterations will occur to the reviewer. For example, other suitable types of devices may be utilized in place of FETs, such as other types of transistors or any other components suitable for providing regulation of current or voltage. These will all be, however, within the spirit of the invention. Accordingly, reference should be made to the appended claims in order to ascertain the true scope of the invention.

What is claimed is:

1. A method of suppressing an arc in a connector having a housing and at least one current conducting element comprising the steps of:
   moving said current conducting element relative to a connection position while under load;
   sensing movement of said current conducting element using arc suppression circuitry connected in parallel with said connector between a current source and a load comprising:
   monitoring voltage across the contacts;
   using an active switching circuit to divert power to a FET when voltage across said contacts reaches a predetermined level; and
   dissipating power said load, whereby arcing are suppressed when the connector is engaged or disengaged.

2. The method of claim 1, wherein said step of moving said current conducting element comprises connecting said connector.

3. The method of claim 1, wherein said step of moving said current conducting element comprises disconnecting the connector.

4. The method of claim 1, wherein said connector comprises at least two current conducting elements and at least one sense pin, and wherein said step of moving said current conducting element comprises sliding said sense pin along said current conducting elements as said connector is engaged and disengaged from a connected condition.

5. The method of claim 1, wherein said connector comprises at least two current conducting elements and at least one sense pin, and wherein said step of sensing movement of said current conducting element comprises sliding said sense pin along the current conducting elements as the connector is engaged and disengaged from a connected condition.

6. An arc suppressing connector, comprising:
   a housing:
   current conducting elements held in the housing and configured to removably engage and disengage mating contacts;
   a transistor connected across the current conducting elements in parallel with a voltage source; and
   an active switching circuit connected to the transistor, the active switching circuit detecting a voltage transition at the current conducting elements and, based thereon, switches a state of the transistor to pass current through the transistor to a load when the current conducting elements are engaged and disengaged with mating contacts.

7. The arc suppressing connector of claim 6, wherein said transistor and said active switching circuit are disposed within said housing.

8. The arc suppressing connector of claim 6, wherein said current conducting element is one of a connector socket and a connector pin.

9. The arc suppressing connector of claim 6, wherein said active switching circuit is connected to a source of power via a disengagable connector.

10. The arc suppressing connector of claim 6, wherein said active switching circuit is connected to a ground connection via a disengagable connector.

11. The arc suppressing connector of claim 6, wherein said connector is coupled to a source of direct current.

12. The arc suppressing connector of claim 6, further comprising a sense pin disposed within a said housing and joined to the active switching circuit, said sense pin being positioned to engage a corresponding one of the current conducting elements.

13. The arc suppressing connector of claim 12, further comprising a pair of sense pins joined to the active switching circuit, each of the sensing pins being aligned to slide along a corresponding one of a pair of the current conducting elements as the connector is engaged and disengaged from a connected condition.

14. The arc suppressing connector of claim 6, wherein said at least one transistor comprises one or more FETs.

15. The arc suppressing connector of claim 6, wherein said transistor is a p-channel MOSFET.

16. The arc suppressing connector of claim 6, wherein the active switching circuit further comprises a monostable multivibrator circuit for controlling the flow of current through said transistor.

17. The arc suppressing connector of claim 6, further comprising a clamping circuit for preventing a voltage transition of said transistor from prematurely re-triggering said active switching circuit.

18. The arc suppression connector of claim 6, wherein the active switching circuit further comprises a multivibrator circuit connected to the transistor to detect a voltage transition at the transistor, the multivibrator circuit changing state based on the voltage transition.

19. The arc suppression connector of claim 6, wherein the active switching circuit detects a voltage transition at the transistor and, in response thereto, changes state and turns on the transistor for a predetermined time out period.

20. The arc suppression connector of claim 6, wherein the active switching circuit includes a multivibrator circuit that detects a negative voltage transition at a drain of the transistor, the multivibrator circuit changing state and turning on the transistor for a predetermined time out period when the negative voltage transition is detected.

* * * * *